Dec. 15, 1936.  M. GREGORICH  2,064,601
BROILER DRAWER CONSTRUCTION
Filed Oct. 5, 1934  2 Sheets-Sheet 1
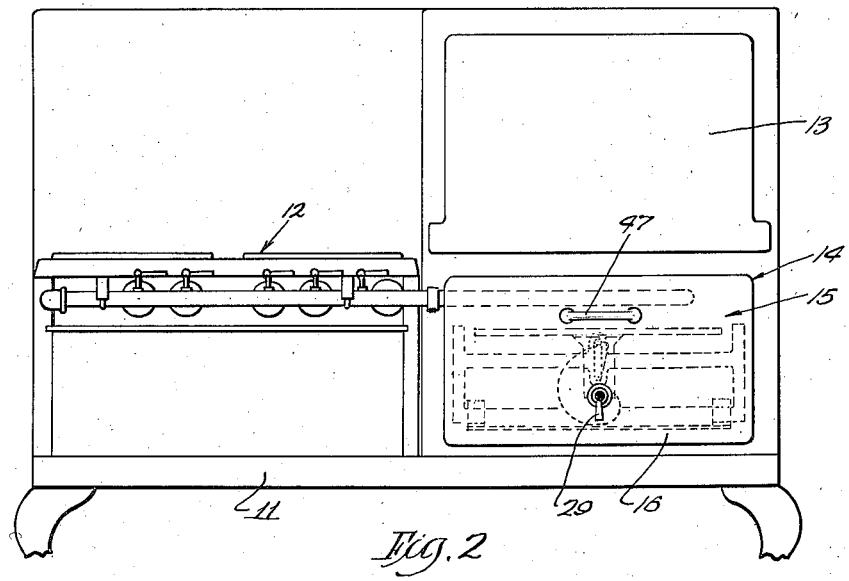
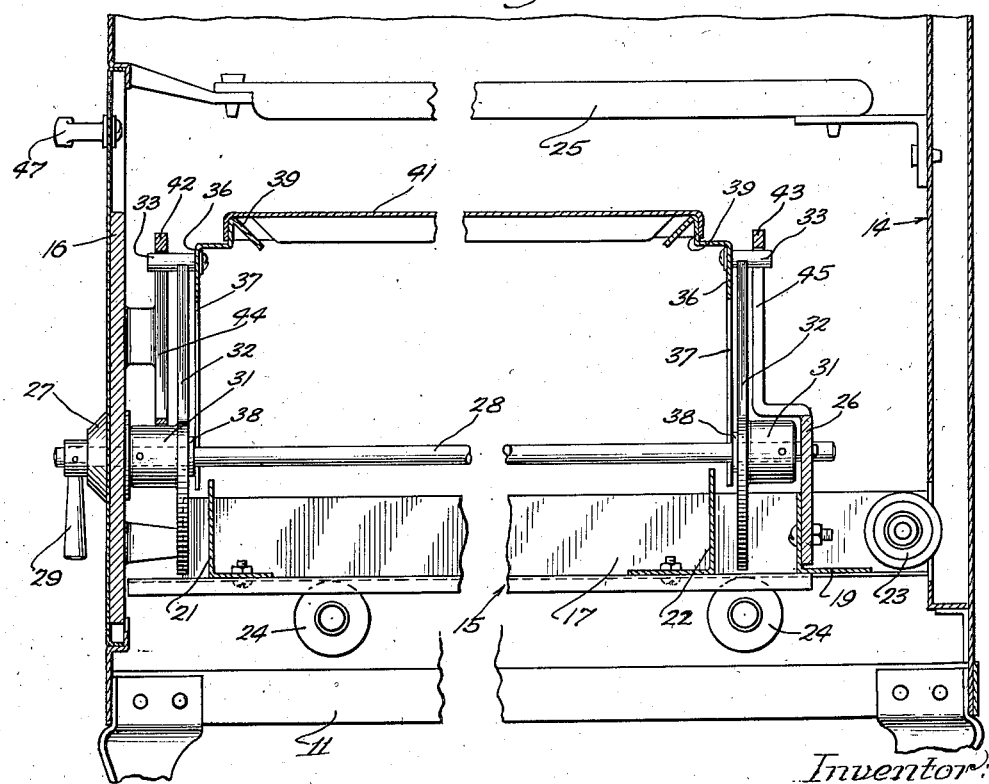
Inventor:
MATTHEW GREGORICH
By Charles B. Rasmussen
Attorney

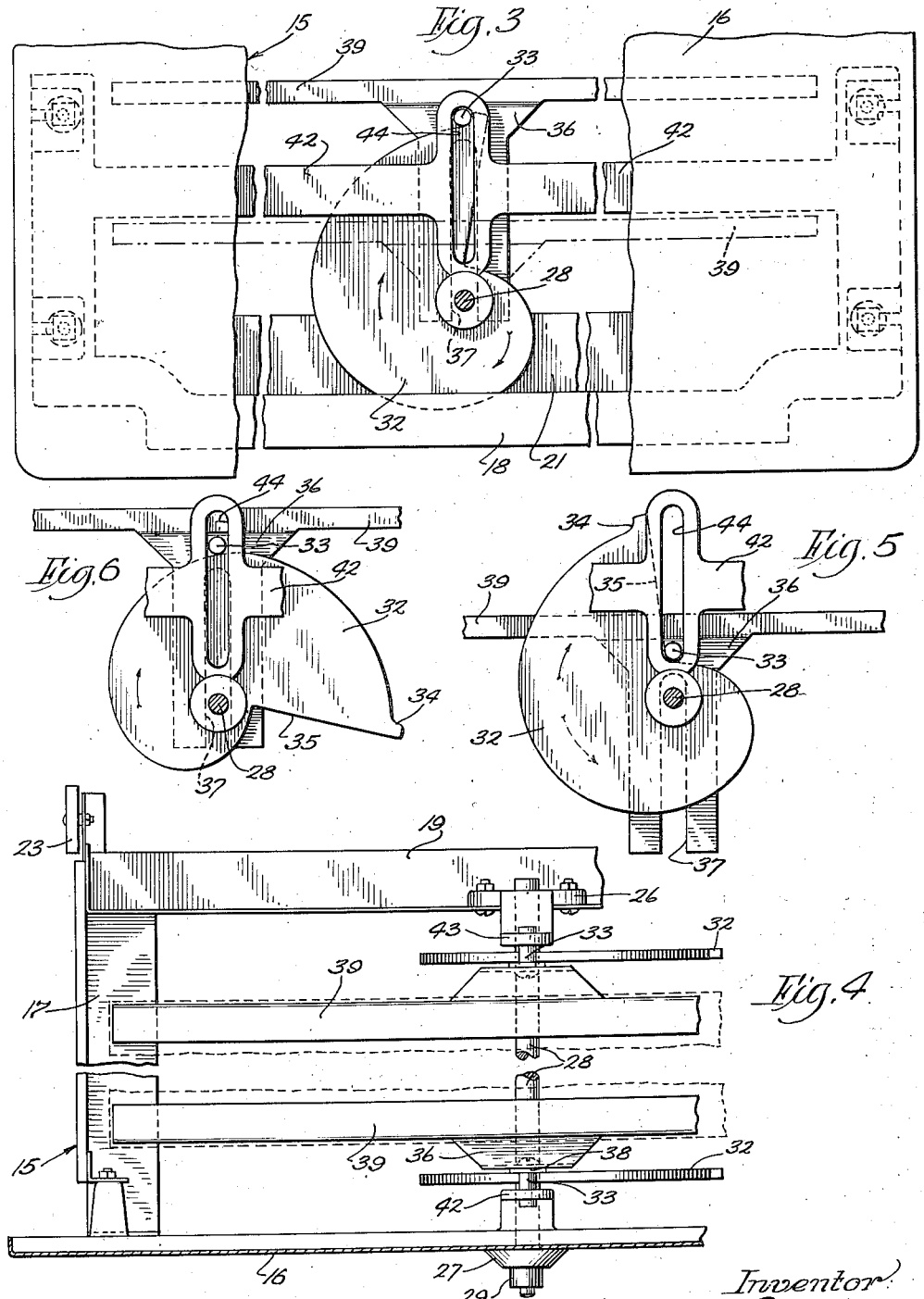

Patented Dec. 15, 1936

2,064,601

UNITED STATES PATENT OFFICE 2,064,601

BROILER DRAWER CONSTRUCTION

Matthew Gregorich, Joliet, Ill., assignor to The Moore Corporation, Joliet, Ill., a corporation of Illinois Application October 5, 1934, Serial No. 746,967

2 Claims. (Cl. 126—41)

My invention relates to stove construction generally, and more particularly to improvements in broiler drawer construction wherein means are provided for adjustably varying the distance between the broiler pan and the flame.

A principal object of the invention is the provision of improved means for raising and lowering the broiler pan which may be operated from the outside of the broiler oven or broiler oven drawer and without pulling the drawer (if one be provided) from its position in the broiler oven, the parts being so constructed and arranged that the broiler pan is raised and lowered vertically and without any of the parts scraping upon the side walls as an incident to the movement of the pan.

Another important object of my invention is the construction of such a broiler pan lifting and lowering device that no additional means is necessary to maintain the pan in any adjusted position.

Numerous other objects and advantages of the invention will be apparent as it is better understood from the following description, which, taken in connection with the accompanying drawings, discloses a preferred embodiment thereof.

In the drawings:

Figure 1 is a partial front elevation of a stove embodying the present invention;

Fig. 2 is a transverse section taken vertically thru the broiler oven and drawer with the broiler pan in fully raised position;

Fig. 3 is a front elevation of the broiler drawer with parts broken away to show part of the broiler pan lifting and lowering mechanism in fully raised position;

Fig. 4 is a partial top plan view of the broiler drawer and associated mechanism; and Figs. 5 and 6 are detail elevations of one of the broiler pan actuating cams and associated mechanism in lowered and in partially elevated position, respectively.

For the purpose of illustrating my invention, I have shown in the drawings a stove comprising a supporting frame 11, a burner plate 12, a baking oven 13, and a broiler compartment or oven 14 into which a drawer 15 may be moved.

The drawer 15 is constructed of metal and has a front wall 16 adapted to close the opening into the compartment 14 when the drawer is pushed into cooking position, and in addition comprises a skeleton frame made up of side angle members 17, front and rear members 18 and 19, and front and rear lateral reinforcing members 21 and 22, respectively, all rigidly connected together.

Suitable guiding rollers 23 are or may be provided on rearward extensions of the side angle members 17 and rollers 24 may be conveniently located within the compartment 14 to support the drawer 15 in its movement. The usual broiler burner 25 is located within the compartment 14 at the top thereof in well known manner.

Journaled in an upstanding member 26 which is secured to the rear channel member 19 of the broiler drawer and a bearing member 27 in the front wall 16 is a shaft 28 which has an operating handle 29 secured to the front end thereof. Secured to shaft 28 adjacent each end thereof by means of integral hub members 31 are a pair of identical cams 32 preferably of metal, but which may be made of fiber or any other suitable material as desired.

Upon turning of the shaft 28 by means of handle 29, the two cams 32 will be rotated in unison to raise or lower a pair of stud pins 33, one of which is associated with and supported by each cam 32. As will be seen from Figs. 5 and 6, the high point of each cam 32 is provided with a limiting stop shoulder 34, while the radially inclined surface 35 extending therefrom to the low point of the cam acts as a stop member to limit rotation of the cams and shaft in the opposite direction.

The stud pins 33 are rigidly secured to and support T-shaped supporting members 36 which have guiding slots 37 in their depending portions which embrace shaft 28. Interposed between these slotted guiding members 36 and the cams 32 on the shaft 28 are spacing washers 38. The upper cross arm portions 39 of the members 36 are adapted to support the broiler pan 41.

To maintain the pins 33 and their associated parts in a vertical plane in their movement by cams 32, front and rear guide members 42 and 43, respectively, are provided. Member 42 constitutes part of the broiler drawer frame mechanism, as can best be seen in Fig. 3, and has a slot 44 therein which embraces front pin 33, while member 43 comprises an offset portion of member 26 and has a vertical pin guiding and embracing slot 45 therein.

The usual handle 47 is attached to the front wall 16 to facilitate movement of the broiler drawer 15 into and out of the broiler oven or compartment 14.

In the operation of the above described device, rotation of the handle 29 causes similar rotation of the two cams 32 to raise or lower pins 33, supporting members 36 and broiler pan 41 to position the latter in any desired relation to the broiler burner 25. Figures 2 and 3 show the broiler pan in the extreme upper position, Figure 5 and the dotted line representation of Figure 3 show the mechanism in extreme lower position, and Figure 6 shows the device in an intermediate position. It will be apparent that, due to the slotted guiding members 42 and 43 embracing the supporting studs 33, and the slotted supporting members 36 embracing the shaft 28, all parts moved by the cams 32 must be constrained to a purely vertical movement. And, due to the frictional resistance of the parts, and the particular shape of the cam actuators 32, it will also be apparent that, regardless of to what position the parts are raised or lowered or what load, within reason, is carried by the broiler pan, the pan will be maintained in such position without the necessity of any additional latching or holding means.

It is thought that the invention and its many attendant advantages will be understood from the foregoing description, and it will be apparent that various changes and modifications may be made in the form, construction and arrangement of the parts without departing from the spirit and scope of the invention or sacrificing all of its material advantages, the form hereinbefore described being merely a preferred embodiment thereof.

I claim:

1. In a broiler drawer having a pan supporting member, a shaft rotatably mounted in said drawer, and a plurality of cam shaped members fixedly mounted on said shaft for variably positioning said pan supporting member, said pan supporting member having depending slotted guide portions, and said shaft extending through the slots of said guide portions.

2. In a broiler drawer having a movable pan supporting member with a slotted portion depending therefrom and a stud fixedly mounted thereon, a slotted member fixed to the frame of said drawer, and a rod mounted in said frame, said stud extending into the slot of said slotted member and said rod extending through the slot of said depending portion to guide said pan supporting member in its movements.

MATTHEW GREGORICH.